United States Patent
Graziosi et al.

(10) Patent No.: US 11,030,777 B2
(45) Date of Patent: Jun. 8, 2021

(54) ADAPTIVE SUBBAND CODING FOR LIFTING TRANSFORM

(71) Applicant: SONY CORPORATION, Tokyo (JP)

(72) Inventors: Danillo Graziosi, San Jose, CA (US); Arash Vosoughi, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 55 days.

(21) Appl. No.: 16/266,332

(22) Filed: Feb. 4, 2019

(65) Prior Publication Data
US 2020/0090373 A1    Mar. 19, 2020

Related U.S. Application Data

(60) Provisional application No. 62/731,588, filed on Sep. 14, 2018.

(51) Int. Cl.
*G06K 9/00*    (2006.01)
*G06T 9/00*    (2006.01)
*G06T 15/00*    (2011.01)

(52) U.S. Cl.
CPC .............. *G06T 9/00* (2013.01); *G06T 15/00* (2013.01)

(58) Field of Classification Search
CPC ...... H04N 19/167; H04N 19/17; H04N 19/30; H04N 19/51; H04N 19/513; H04N 19/147; H04N 19/63; H04N 19/96; H04N 19/124; H04N 19/36; H04N 19/60; H04N 19/10; H04N 19/187; H04N 19/29; H04N 19/18; H04N 19/12; H04N 19/126; H04N 19/186; H04N 19/103; H04N 19/52; H04N 19/90; H04N 19/119; H04N 19/573; H04N 19/463; H04N 19/517; H04N 19/176; H04N 19/159; H04N 19/56; H04N 19/139; H04N 19/86; H04N 19/122; H04N 19/14;
(Continued)

(56) References Cited

U.S. PATENT DOCUMENTS 5,621,855 A * 4/1997 Veldhuis ................. G06T 9/007
                                                                 704/229
6,018,368 A * 1/2000 Kim ..................... H04N 19/176
                                                                 348/699
(Continued)

OTHER PUBLICATIONS

Gustavo Sandri, "Comments on Compression of 3D Point Clouds Using a Region-Adaptive Hierarchical Transform", pp. 1-4.
(Continued)

*Primary Examiner* — Alex Kok S Liew
(74) *Attorney, Agent, or Firm* — Haverstock & Owens LLP

(57) ABSTRACT

Lifting is a transform designed for color compression of point clouds which is adopted in one of the MPEG test models. The performance of lifting is improved herein. All the lifting coefficients are first divided into several subbands based on their assigned weights, which indicate the level of importance of each coefficient. Then, for each subband, a set of three dead-zones are derived for the three color components. The dead-zones of Cb and Cr channels are typically larger than that of Luma channel. In the original lifting scheme, Chroma is not suppressed at all. In contrast, as described herein, the size of the dead-zone is increased for different color components, which means that more quality (and bandwidth) is able to be adaptively provided for luminance coefficients than chrominance coefficients.

24 Claims, 3 Drawing Sheets

(58) Field of Classification Search
CPC .... H04N 19/51; H04N 19/187; H04N 19/124; H04N 19/463; H04N 19/96; H04N 19/117; H04N 19/50; H04N 19/593; H04N 19/61; H04N 19/625; H04N 19/46; H04N 19/59; H04N 19/105; H04N 19/115; B60T 13/573; G06T 9/40; G06T 9/00; G06T 9/001; G06T 15/00; G06T 9/007; G06T 1/0057; G06T 2201/0081; G06T 2201/0202; G06T 9/007; G06T 9/00; G06T 3/40; G06T 7/0012; G06T 2207/10028; G06T 7/50; G06T 17/005; G06T 3/4007; H03M 7/24; H03M 7/3059; G01B 11/254; G06K 9/00201; G06K 9/38; G06N 5/003
USPC .......... 358/520, 523, 539; 382/232–251, 166
See application file for complete search history.

(56) References Cited

U.S. PATENT DOCUMENTS

| | | | | |
|---|---|---|---|---|
| 6,044,172 | A * | 3/2000 | Allen | H04N 1/646 358/523 |
| 7,423,791 | B2 * | 9/2008 | Tin | H04N 1/6022 345/600 |
| 7,916,952 | B2 * | 3/2011 | Demos | H04N 19/85 382/232 |
| 8,509,555 | B2 | 8/2013 | Meany | |
| 9,749,646 | B2 | 8/2017 | Zhu et al. | |
| 10,044,974 | B2 | 8/2018 | Aharon et al. | |
| 2007/0168410 | A1 * | 7/2007 | Reznik | G06F 7/60 708/490 |
| 2010/0172567 | A1 * | 7/2010 | Prokoski | A61B 5/415 382/132 |
| 2011/0128403 | A1 * | 6/2011 | Easwar | H04N 1/46 348/222.1 |
| 2012/0033273 | A1 * | 2/2012 | Klassen | H04N 1/6022 358/505 |
| 2012/0281009 | A1 * | 11/2012 | Ward | H04N 5/2355 345/589 |
| 2016/0150238 | A1 * | 5/2016 | Park | H04N 19/136 375/240.08 |
| 2017/0347100 | A1 * | 11/2017 | Chou | H03M 7/3066 |
| 2017/0347122 | A1 * | 11/2017 | Chou | H04N 19/36 |
| 2018/0075622 | A1 * | 3/2018 | Tuffreau | G06T 9/001 |
| 2019/0116357 | A1 * | 4/2019 | Tian | H04N 19/597 |
| 2020/0029087 | A1 * | 1/2020 | Lim | H04N 19/119 |
| 2020/0145651 | A1 * | 5/2020 | Abe | H04N 19/503 |

OTHER PUBLICATIONS

Omprakash Rajankar, "Generalized Multiple ROI Prioritization in JPEG2000 for Natural Images" ISSM:00975-9646, International Journal of Computer Science and Information Technologies, vol. 6(2), 2015, 1636-1642.

* cited by examiner

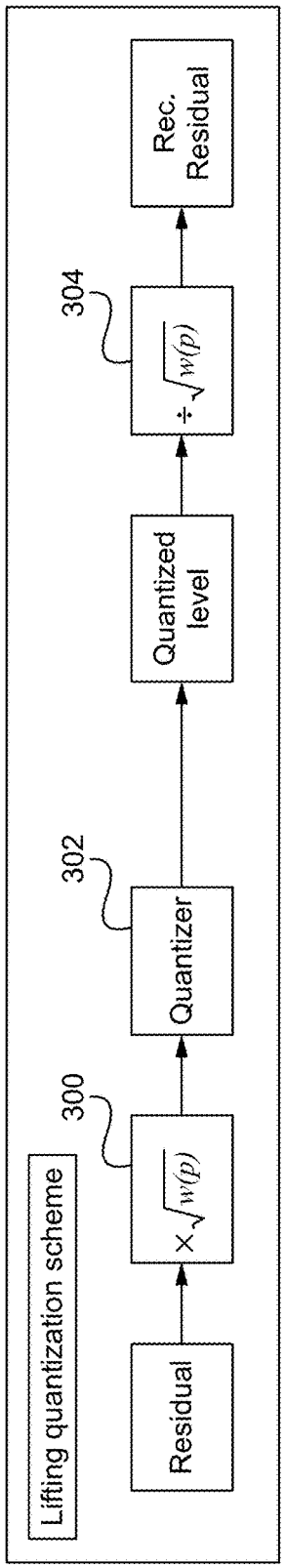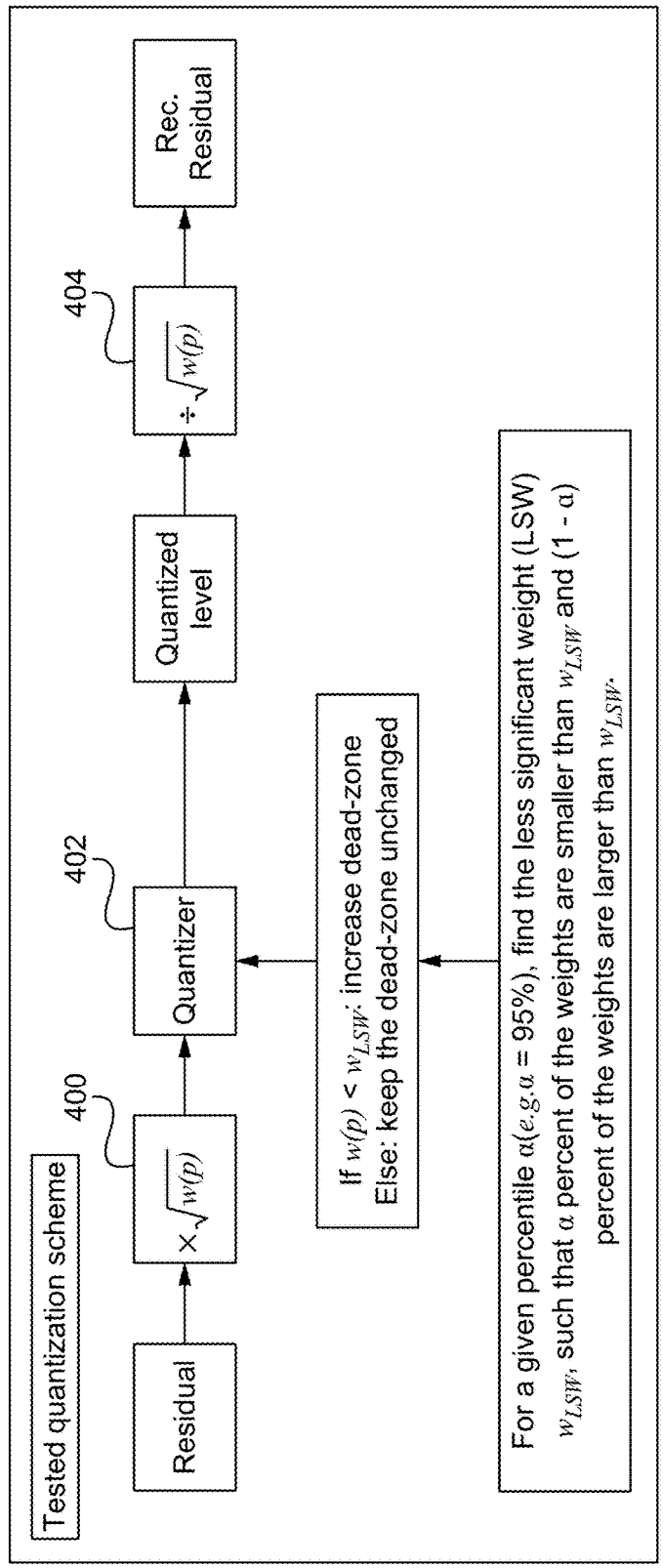

ADAPTIVE SUBBAND CODING FOR LIFTING TRANSFORM

CROSS-REFERENCE TO RELATED APPLICATION(S)

This application claims priority under 35 U.S.C. § 119(e) of the U.S. Provisional Patent Application Ser. No. 62/731,588, filed Sep. 14, 2018 and titled, "ADAPTIVE SUBBAND CODING FOR LIFTING TRANSFORM," which is hereby incorporated by reference in its entirety for all purposes.

FIELD OF THE INVENTION

The present invention relates to three dimensional graphics. More specifically, the present invention relates to compression of three dimensional graphics.

BACKGROUND OF THE INVENTION

A lifting transform, which is a point cloud color compression method adopted in PCC test model TMC13 for compression of CAT1 sequences, is not optimally implemented.

SUMMARY OF THE INVENTION

Lifting is a transform designed for color compression of point clouds which is adopted in one of the MPEG test models. The performance of lifting is improved herein. All the lifting coefficients are first divided into several subbands based on their assigned weights, which indicate the level of importance of each coefficient. Then, for each subband, a set of three dead-zones are derived for the three color components. The dead-zones of Cb and Cr channels are typically larger than that of Luma channel. In the original lifting scheme, Chroma is not suppressed at all. In contrast, as described herein, the size of the dead-zone is increased for different color components, which means that more quality (and bandwidth) is able to be adaptively provided for luminance coefficients than chrominance coefficients.

In one aspect, a method programmed in a non-transitory memory of a device comprises multiplying a residual of a point cloud by a weight to generate a weighted residual, quantizing the weighted residual to generate a quantized level and dividing the quantized level by the weight to generate a reconstructed residual which is used for color compression of the point cloud. The method further comprises dividing a plurality of lifting coefficients into a plurality of subbands and deriving a set of dead-zones for each subband for a set of color components. Dividing the plurality of lifting coefficients into the plurality of subbands is based on an assigned weight of each lifting coefficient. The set of color components includes Cb, Cr and luma channels. The weight is a square root of the weight of a point. If the weight of the point is less than a weight of a less significant weight, then a dead-zone size is increased. The weight is based on how many times a point has been used for prediction and distances to predicted points.

In another aspect, an apparatus comprises a non-transitory memory for storing an application, the application for: multiplying a residual of a point cloud by a weight to generate a weighted residual, quantizing the weighted residual to generate a quantized level and dividing the quantized level by the weight to generate a reconstructed residual which is used for color compression of the point cloud and a processor coupled to the memory, the processor configured for processing the application. The application is further for: dividing a plurality of lifting coefficients into a plurality of subbands and deriving a set of dead-zones for each subband for a set of color components. Dividing the plurality of lifting coefficients into the plurality of subbands is based on an assigned weight of each lifting coefficient. The set of color components includes Cb, Cr and luma channels. The weight is a square root of the weight of a point. If the weight of the point is less than a weight of a less significant weight, then a dead-zone size is increased. The weight is based on how many times a point has been used for prediction and distances to predicted points.

In another aspect, a system comprises a multiplication module configured for multiplying a residual of a point cloud by a weight to generate a weighted residual, a quantization module configured for quantizing the weighted residual to generate a quantized level and a dividing module configured for dividing the quantized level by the weight to generate a reconstructed residual which is used for color compression of the point cloud. The system further comprises a subband module configured for dividing a plurality of lifting coefficients into a plurality of subbands and a deriving module configured for deriving a set of dead-zones for each subband for a set of color components. Dividing the plurality of lifting coefficients into the plurality of subbands is based on an assigned weight of each lifting coefficient. The set of color components includes Cb, Cr and luma channels. The weight is a square root of the weight of a point. If the weight of the point is less than a weight of a less significant weight, then a dead-zone size is increased. The weight is based on how many times a point has been used for prediction and distances to predicted points.

BRIEF DESCRIPTION OF THE DRAWINGS

FIG. 3 illustrates a flowchart of implementing a lifting quantization scheme.

FIG. 4 illustrates a flowchart of implementing the adaptive subband coding for lifting transform according to some embodiments.

DETAILED DESCRIPTION OF THE PREFERRED EMBODIMENT

Lifting is a transform designed for color compression of point clouds which is adopted in one of the MPEG test models. The performance of lifting is improved herein. All the lifting coefficients (or residuals) are first divided into several subbands based on their assigned weights, which indicate the level of importance of each coefficient. Then, for each subband, a set of three dead-zones are derived for the three color components. The dead-zones of Cb and Cr channels are typically larger than that of Luma channel. In the original lifting scheme, Chroma is not suppressed at all. In contrast, as described herein, the size of the dead-zone is increased for different color components, which means that more quality (and bandwidth) is able to be adaptively provided for luminance coefficients than chrominance coefficients. Then, the point cloud content (or other 3D content) is encoded using the lifting transform.

Figure 1:
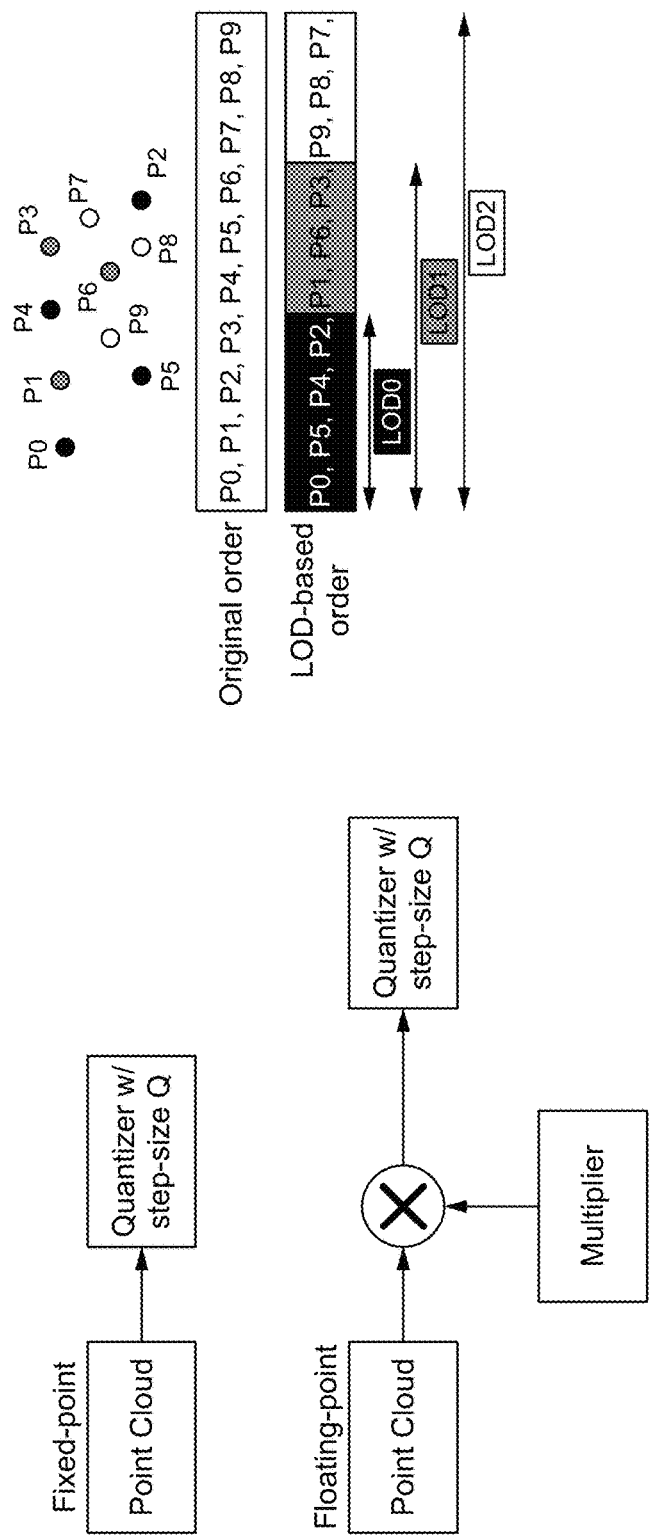
FIG. 1 illustrates a diagram of the TMC13 quantization strategy according to some embodiments.

FIG. 1 illustrates a diagram of the TMC13 quantization strategy according to some embodiments. For the fixed-point, a point cloud is quantized using a quantizer with a step-size Q. For floating-point, a point cloud is multiplied by a multiplier and then quantized with step-size Q. If not multiplied by the multiplier, significant color distortion is observed at the output due to reduced precision when a quantizer with fixed point step-size is used. For the multiplier, each point is assigned an influence weight, which depends on how many times the point has been used for prediction and what are the distances to the predicted points. The higher the number of times used for prediction, the larger the influence weight. The smaller the distance to the predicted points, the larger the influence weight. Points in a lower Level of Detail (LOD) usually have larger influence weights since they are usually used more for prediction of the remaining points. As shown in FIG. 1, the points are able to be re-ordered based on the LOD.

Figure 2:
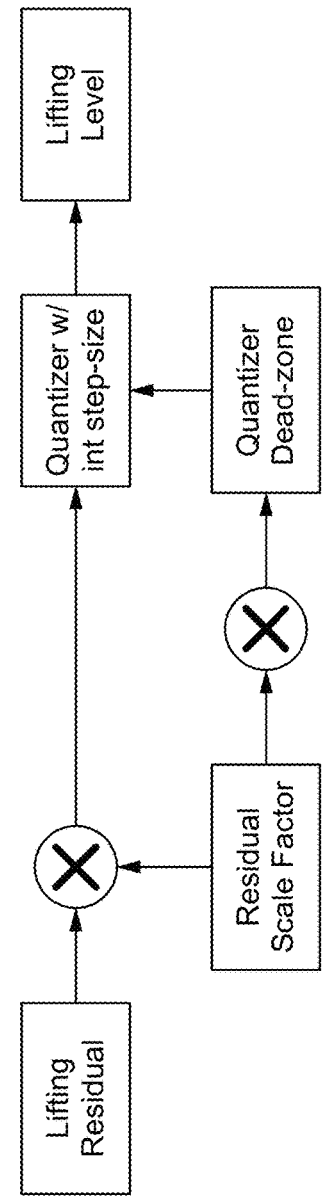
FIG. 2 illustrates a diagram of using lifting for TMC13 according to some embodiments.

FIG. 2 illustrates a diagram of using lifting for TMC13 according to some embodiments. A lifting residual is multiplied by a residual scale factor, and the result is sent to a quantizer with an integer step-size. The residual scale factor is also multiplied and sent to a quantizer dead-zone, where the result goes to the quantizer with an integer step-size. The quantizer with an integer step-size determines the lifting level.

FIG. 3 illustrates a flowchart of implementing a lifting quantization scheme. In the step 300, a lifting residual (or a block of residuals) is multiplied by a weight (e.g., the square root of a weight of a point, w(p)) to generate a weighted residual. In the step 302, the weighted residual goes to a quantizer to be quantized to generate a quantized level. In the step 304, the quantized level is divided by the weight to generate a reconstructed residual.

FIG. 4 illustrates a flowchart of implementing the adaptive subband coding for lifting transform according to some embodiments. In the step 400, a lifting residual (or a block of residuals) is multiplied by a weight (e.g., the square root of a weight of a point, w(p)) to generate a weighted residual. In the step 402, the weighted residual goes to a quantizer to be quantized to generate a quantized level. At the quantizer, if $w(p) < w_{LSW}$, then the dead-zone is increased; otherwise, the dead-zone is kept unchanged, where $w_{LSW}$ is the weight of the less significant weight. For a given percentile $\alpha$ (e.g., $\alpha=95\%$), an objective is to find the less significant weight, $w_{LSW}$, such that $\alpha$ percent of the weights are smaller than $w_{LSW}$ and $(1-\alpha)$ percent of the weights are larger than $w_{LSW}$. In the step 404, the quantized level is divided by the weight to generate a reconstructed residual, which is used for color compression of a point cloud. In some embodiments, fewer or additional steps are implemented. In some embodiments, the order of the steps is modified.

Figure 5:
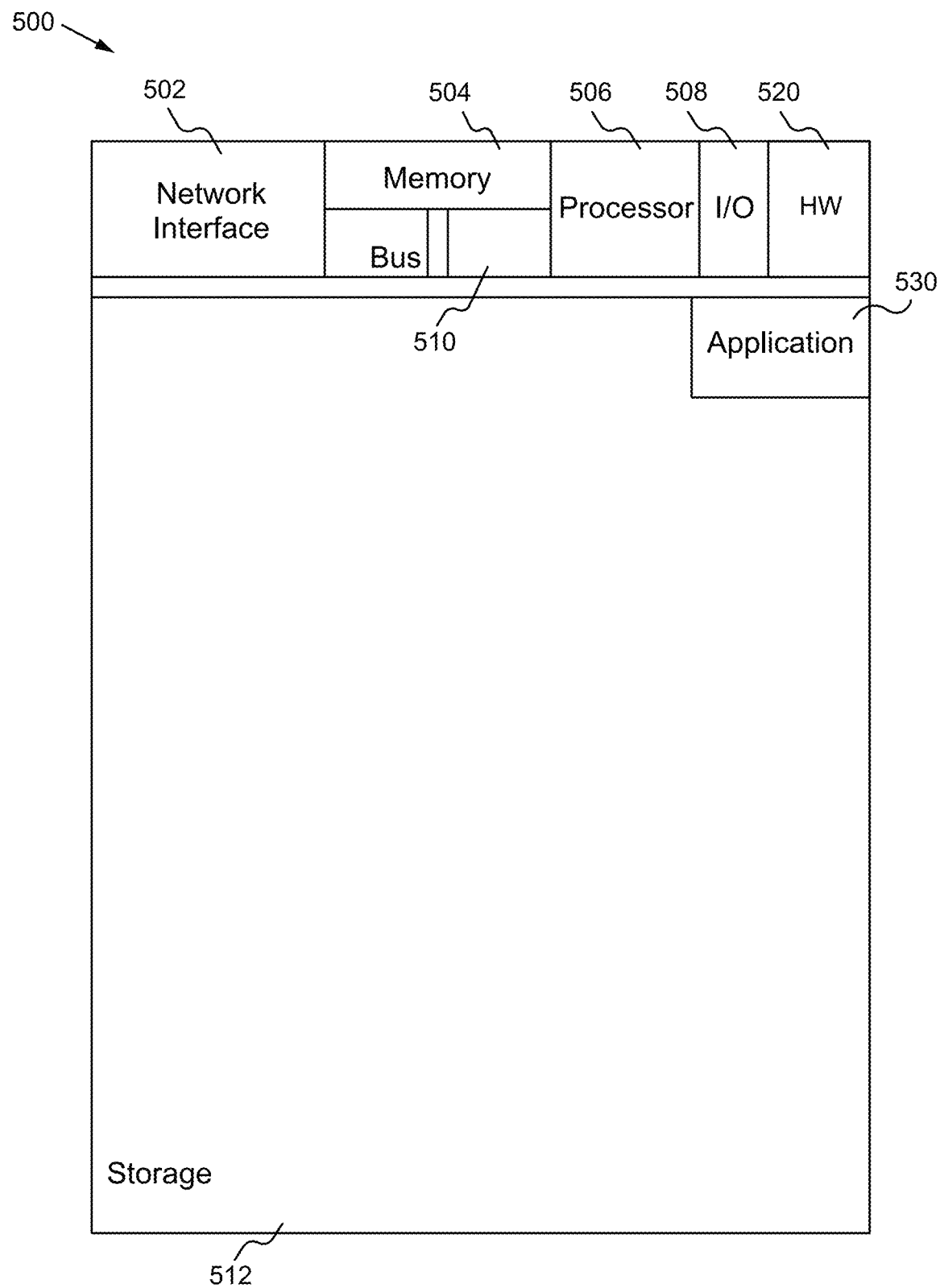
FIG. 5 illustrates a block diagram of an exemplary computing device configured to implement the adaptive subband coding method according to some embodiments.

FIG. 5 illustrates a block diagram of an exemplary computing device configured to implement the adaptive subband coding method according to some embodiments. The computing device 500 is able to be used to acquire, store, compute, process, communicate and/or display information such as images and videos including 3D content. The computing device 500 is able to implement any of the adaptive subband coding aspects. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Adaptive subband coding application(s) 530 used to implement the adaptive subband coding method are likely to be stored in the storage device 512 and memory 504 and processed as applications are typically processed. More or fewer components shown in FIG. 5 are able to be included in the computing device 500. In some embodiments, adaptive subband coding hardware 520 is included. Although the computing device 500 in FIG. 5 includes applications 530 and hardware 520 for the adaptive subband coding method, the adaptive subband coding method is able to be implemented on a computing device in hardware, firmware, software or any combination thereof. For example, in some embodiments, the adaptive subband coding applications 530 are programmed in a memory and executed using a processor. In another example, in some embodiments, the adaptive subband coding hardware 520 is programmed hardware logic including gates specifically designed to implement the adaptive subband coding method.

In some embodiments, the adaptive subband coding application(s) 530 include several applications and/or modules. In some embodiments, modules include one or more sub-modules as well. In some embodiments, fewer or additional modules are able to be included.

In some embodiments, the adaptive subband coding hardware 520 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the adaptive subband coding method described herein, a device acquires or receives 3D content and processes and/or sends the content in an optimized manner to enable proper, efficient display of the 3D content. The adaptive subband coding method is able to be implemented with user assistance or automatically without user involvement.

In operation, the adaptive subband coding method more efficiently processes 3D content including compressing the data such that much less information is sent.

Some Embodiments of Adaptive Subband Coding for Lifting Transform

1. A method programmed in a non-transitory memory of a device comprising:
   multiplying a residual of a point cloud by a weight to generate a weighted residual;

quantizing the weighted residual to generate a quantized level; and dividing the quantized level by the weight to generate a reconstructed residual which is used for color compression of the point cloud.

2. The method of clause 1 further comprising:

dividing a plurality of lifting coefficients into a plurality of subbands; and deriving a set of dead-zones for each subband for a set of color components.

3. The method of clause 2 wherein dividing the plurality of lifting coefficients into the plurality of subbands is based on an assigned weight of each lifting coefficient.

4. The method of clause 2 wherein the set of color components includes Cb, Cr and luma channels.

5. The method of clause 1 wherein the weight is a square root of the weight of a point.

6. The method of clause 5 wherein if the weight of the point is less than a weight of a less significant weight, then a dead-zone size is increased.

7. The method of clause 1 wherein the weight is based on how many times a point has been used for prediction and distances to predicted points.

8. An apparatus comprising:

a non-transitory memory for storing an application, the application for:

multiplying a residual of a point cloud by a weight to generate a weighted residual;

quantizing the weighted residual to generate a quantized level; and dividing the quantized level by the weight to generate a reconstructed residual which is used for color compression of the point cloud; and a processor coupled to the memory, the processor configured for processing the application.

9. The apparatus of clause 8 wherein the application is further for:

dividing a plurality of lifting coefficients into a plurality of subbands; and deriving a set of dead-zones for each subband for a set of color components.

10. The apparatus of clause 9 wherein dividing the plurality of lifting coefficients into the plurality of subbands is based on an assigned weight of each lifting coefficient.

11. The apparatus of clause 9 wherein the set of color components includes Cb, Cr and luma channels.

12. The apparatus of clause 8 wherein the weight is a square root of the weight of a point.

13. The apparatus of clause 12 wherein if the weight of the point is less than a weight of a less significant weight, then a dead-zone size is increased.

14. The apparatus of clause 8 wherein the weight is based on how many times a point has been used for prediction and distances to predicted points.

15. A system comprising:

a multiplication module configured for multiplying a residual of a point cloud by a weight to generate a weighted residual;

a quantization module configured for quantizing the weighted residual to generate a quantized level; and a dividing module configured for dividing the quantized level by the weight to generate a reconstructed residual which is used for color compression of the point cloud.

16. The system of clause 15 further comprising:

a subband module configured for dividing a plurality of lifting coefficients into a plurality of subbands; and a deriving module configured for deriving a set of dead-zones for each subband for a set of color components.

17. The system of clause 16 wherein dividing the plurality of lifting coefficients into the plurality of subbands is based on an assigned weight of each lifting coefficient.

18. The system of clause 16 wherein the set of color components includes Cb, Cr and luma channels.

19. The system of clause 15 wherein the weight is a square root of the weight of a point.

20. The system of clause 19 wherein if the weight of the point is less than a weight of a less significant weight, then a dead-zone size is increased.

21. The system of clause 15 wherein the weight is based on how many times a point has been used for prediction and distances to predicted points.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:

multiplying a residual of a point cloud by a weight to generate a weighted residual;

quantizing the weighted residual to generate a quantized level;

dividing the quantized level by the weight to generate a reconstructed residual which is used for color compression of the point cloud;

dividing a plurality of lifting coefficients into a plurality of subbands; and deriving a set of dead-zones for each subband for a set of color components, wherein the set of dead-zones includes dead-zones of Cb and Cr channels that are larger than a dead-zone of a Luma channel.

2. The method of claim 1 wherein dividing the plurality of lifting coefficients into the plurality of subbands is based on an assigned weight of each lifting coefficient.

3. The method of claim 1 wherein the set of color components includes Cb, Cr and luma channels.

4. The method of claim 1 wherein the weight is a square root of the weight of a point.

5. The method of claim 4 wherein if the weight of the point is less than a weight of a less significant weight, then a dead-zone size is increased.

6. The method of claim 1 wherein the weight is based on how many times a point has been used for prediction and distances to predicted points.

7. An apparatus comprising:

a non-transitory memory for storing an application, the application for:

multiplying a residual of a point cloud by a weight to generate a weighted residual;

quantizing the weighted residual to generate a quantized level;

dividing the quantized level by the weight to generate a reconstructed residual which is used for color compression of the point cloud;

dividing a plurality of lifting coefficients into a plurality of subbands; and deriving a set of dead-zones for each subband for a set of color components, wherein the set of dead-zones includes dead-zones of Cb and Cr channels that are larger than a dead-zone of a Luma channel; and a processor coupled to the memory, the processor configured for processing the application.

8. The apparatus of claim 7 wherein dividing the plurality of lifting coefficients into the plurality of subbands is based on an assigned weight of each lifting coefficient.

9. The apparatus of claim 7 wherein the set of color components includes Cb, Cr and luma channels.

10. The apparatus of claim 7 wherein the weight is a square root of the weight of a point.

11. The apparatus of claim 10 wherein if the weight of the point is less than a weight of a less significant weight, then a dead-zone size is increased.

12. The apparatus of claim 7 wherein the weight is based on how many times a point has been used for prediction and distances to predicted points.

13. A system comprising:
a multiplication module configured for multiplying a residual of a point cloud by a weight to generate a weighted residual;
a quantization module configured for quantizing the weighted residual to generate a quantized level;
a dividing module configured for dividing the quantized level by the weight to generate a reconstructed residual which is used for color compression of the point cloud;
a subband module configured for dividing a plurality of lifting coefficients into a plurality of subbands; and
a deriving module configured for deriving a set of dead-zones for each subband for a set of color components, wherein the set of dead-zones includes dead-zones of Cb and Cr channels that are larger than a dead-zone of a Luma channel.

14. The system of claim 13 wherein dividing the plurality of lifting coefficients into the plurality of subbands is based on an assigned weight of each lifting coefficient.

15. The system of claim 13 wherein the set of color components includes Cb, Cr and luma channels.

16. The system of claim 13 wherein the weight is a square root of the weight of a point.

17. The system of claim 16 wherein if the weight of the point is less than a weight of a less significant weight, then a dead-zone size is increased.

18. The system of claim 13 wherein the weight is based on how many times a point has been used for prediction and distances to predicted points.

19. The method of claim 5 wherein for a given percentile, the less significant weight is found such that a percent of the weights are smaller than the less significant weight and $(1-\alpha)$ percent of the weights are larger than the less significant weight.

20. A method programmed in a non-transitory memory of a device comprising:
multiplying a residual of a point cloud by a weight to generate a weighted residual;
quantizing the weighted residual to generate a quantized level;
dividing the quantized level by the weight to generate a reconstructed residual which is used for color compression of the point cloud, wherein the weight is a square root of the weight of a point, wherein if the weight of the point is less than a weight of a less significant weight, then a dead-zone size is increased, wherein for a given percentile, the less significant weight is found such that a percent of the weights are smaller than the less significant weight and $(1-\alpha)$ percent of the weights are larger than the less significant weight.

21. The method of claim 20 further comprising:
dividing a plurality of lifting coefficients into a plurality of subbands; and
deriving a set of dead-zones for each subband for a set of color components.

22. The method of claim 21 wherein dividing the plurality of lifting coefficients into the plurality of subbands is based on an assigned weight of each lifting coefficient.

23. The method of claim 21 wherein the set of color components includes Cb, Cr and luma channels.

24. The method of claim 20 wherein the weight is based on how many times a point has been used for prediction and distances to predicted points.

* * * * *